United States Patent [19]

Frommelt et al.

[11] Patent Number: 4,750,299
[45] Date of Patent: Jun. 14, 1988

[54] AIR PERIMETER SEAL FOR OPENING

[75] Inventors: John A. Frommelt, Dubuque; Robert J. Frommelt, Peosta, both of Iowa

[73] Assignee: Frommelt Industries, Inc., Dubuque, Iowa

[21] Appl. No.: 11,967

[22] Filed: Feb. 6, 1987

[51] Int. Cl.[4] .............................................. E04B 1/34
[52] U.S. Cl. ..................................... 52/2; 52/173 DS; 14/71.5
[58] Field of Search .................... 52/2, 173 DS; 14/71, 14/71.5

[56] References Cited

U.S. PATENT DOCUMENTS

| | | | |
|---|---|---|---|
| 3,230,675 | 1/1966 | Frommelt et al. | 52/173 DS |
| 3,303,615 | 2/1965 | O'Neal . | |
| 3,391,503 | 7/1968 | O'Neal . | |
| 3,665,997 | 5/1972 | Smith et al. | 52/173 DS |
| 3,816,867 | 6/1974 | Shirzad et al. | 14/71.5 |
| 3,826,049 | 7/1974 | Frommelt et al. | 52/173 DS |
| 3,939,614 | 2/1976 | Frommelt et al. | 52/2 |
| 3,994,103 | 11/1976 | Ouellet | 52/173 DS |
| 4,262,458 | 4/1981 | O'Neal | 52/2 |
| 4,389,821 | 6/1983 | O'Neal . | |
| 4,554,768 | 11/1985 | Srajer | 52/173 DS |
| 4,671,029 | 6/1987 | Bennett, deceased et al. | 52/173 DS |

OTHER PUBLICATIONS

Brochure from Kelley Company, Inc., 6720 North Teutonia Avenue, Milwaukee, Wisconsin 53209-9993, entitled "Seven Foot Wide Dockleveler with 'V' Seal—A Winning Combination".

Brochure of Serco Engineering Corporation, Albany, N.Y. 12020, entitled "Dock Seals and Shelters".

Primary Examiner—Carl D. Friedman
Assistant Examiner—Creighton Smith
Attorney, Agent, or Firm—Emrich & Dithmar

[57] ABSTRACT

A seal disposed about the periphery of an opening such as a warehouse door includes an inflatable head bag and a pair of facing inflatable side bags. The head and side bags are each comprised of a plurality of serially coupled, elongated, aligned pleated sections which are separated by apertured baffles for regulating air flow between adjacent pleated sections. A source of air under pressure such as a blower directs air into an upper head bag which, in turn, directs the air flow into the facing side bags via respective duct arrangements coupling the head bag to the side bags. Under pressure, the head and side bags expand toward the center of the opening to enclose in a sealed manner an object such as a loading vehicle positioned within the opening. Disposed within and along the width of each of the side bags are a plurality of spaced horizontal ropes or straps which are coupled at a first end thereof via an alignment tube to the nose edge of the end, or distal, pleated bag section, and at a second end thereof to vertically movable weights which bias the side bags to the retracted or open positon when air under pressure is no longer provided to the side bags. A plurality of spaced vertical retraction straps in the head bag are wrapped around a spring-biased roller tube positioned in an upper portion of a support frame and extending across the opening for rolling the head bag up in a retracted position when air under pressure is no longer delivered to the perimeter seal.

11 Claims, 4 Drawing Sheets

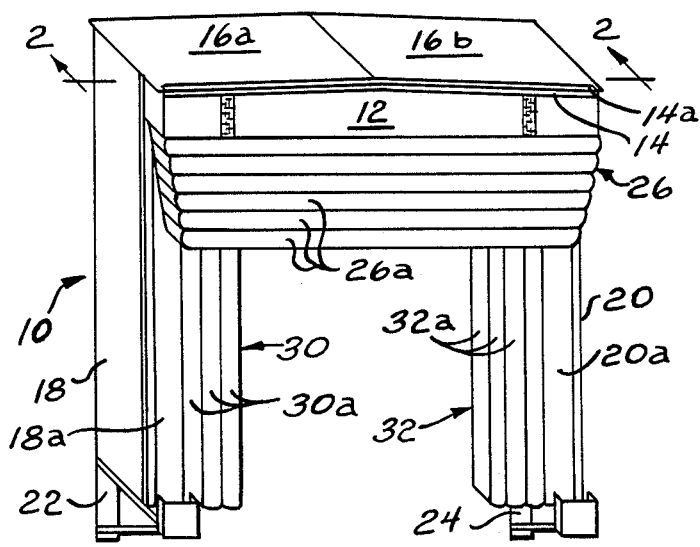
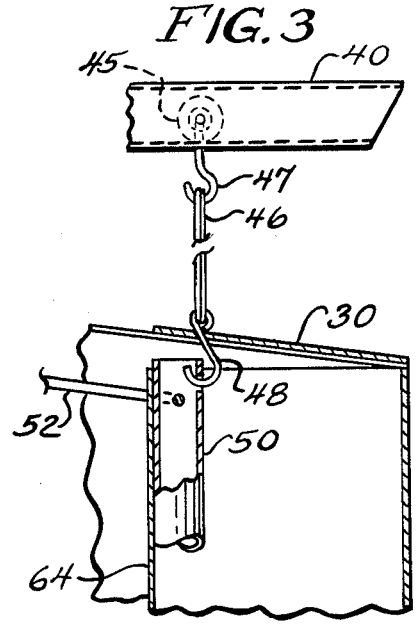
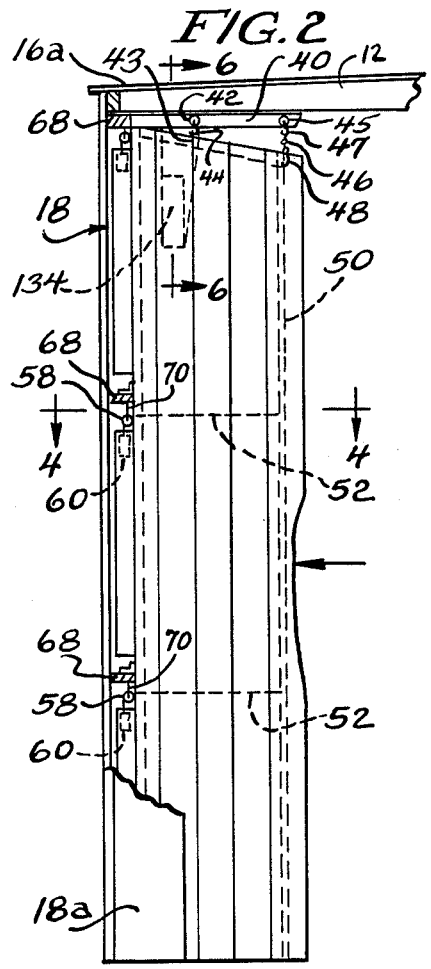
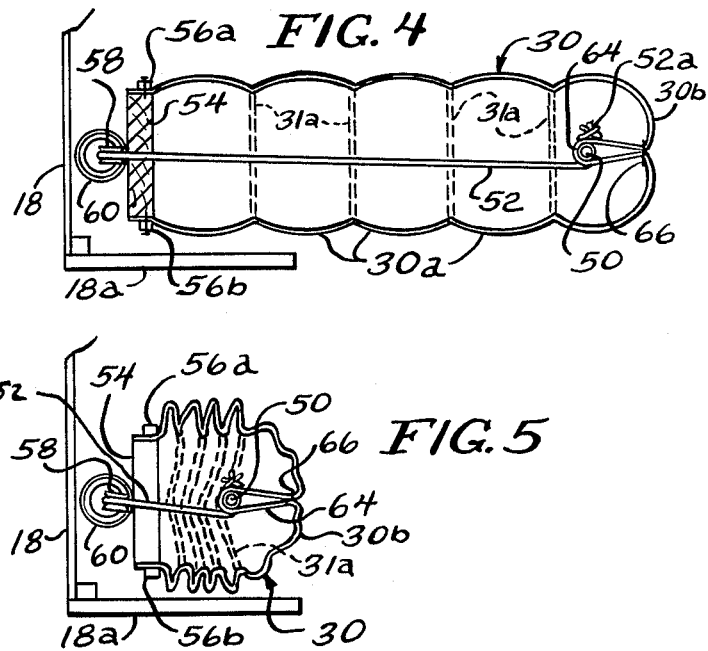
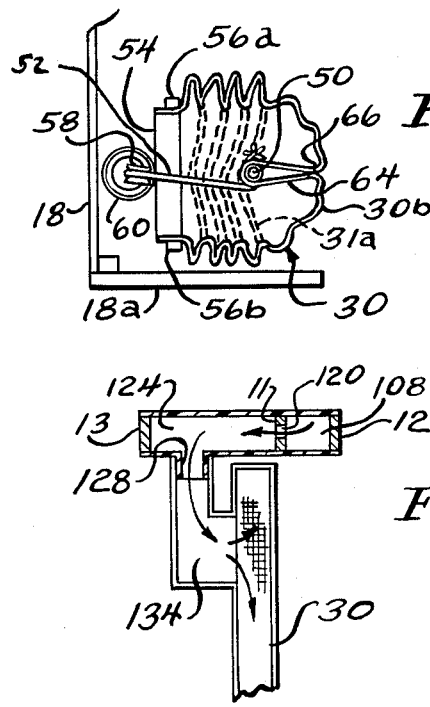
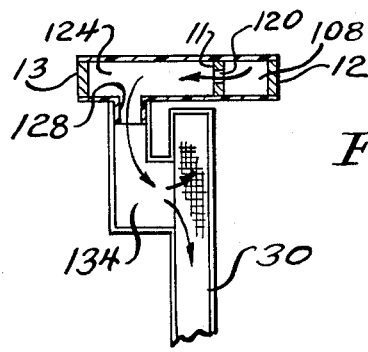

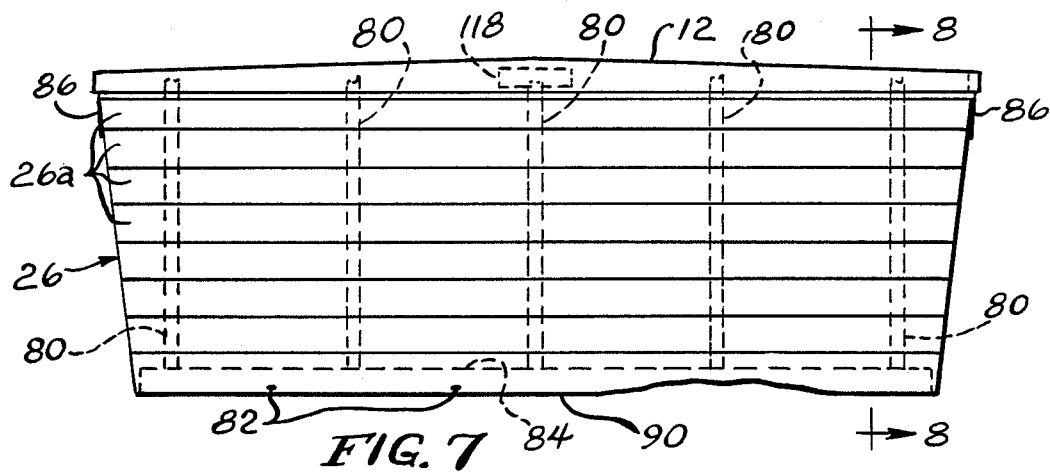
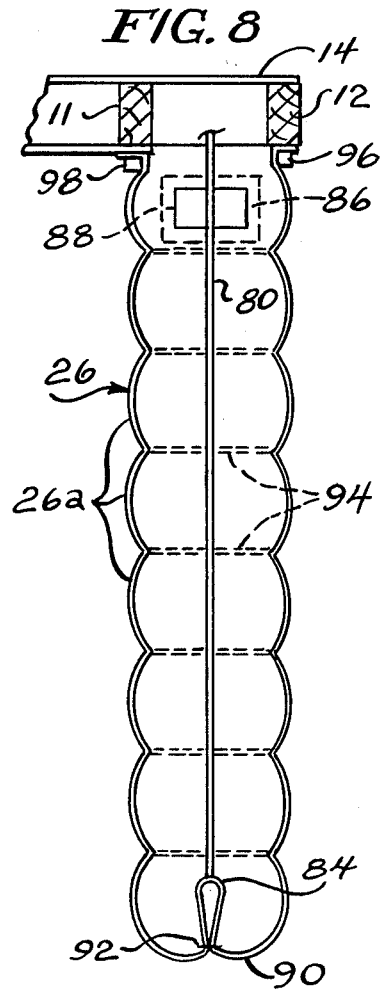
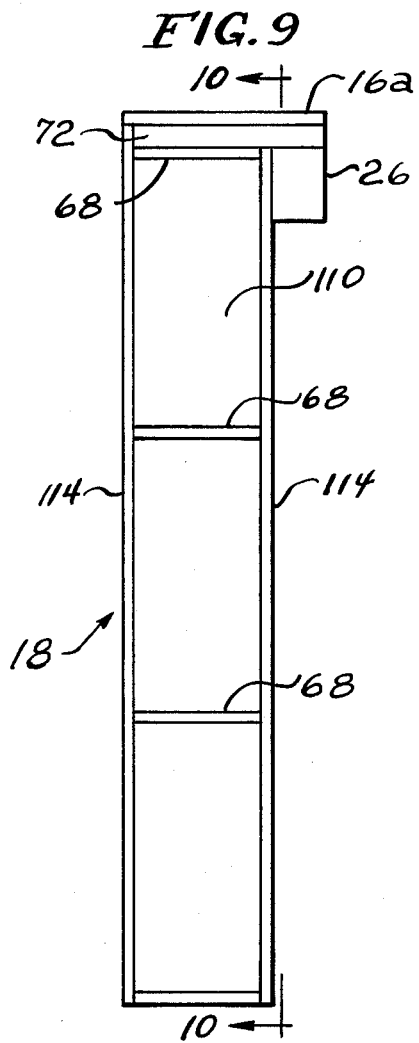

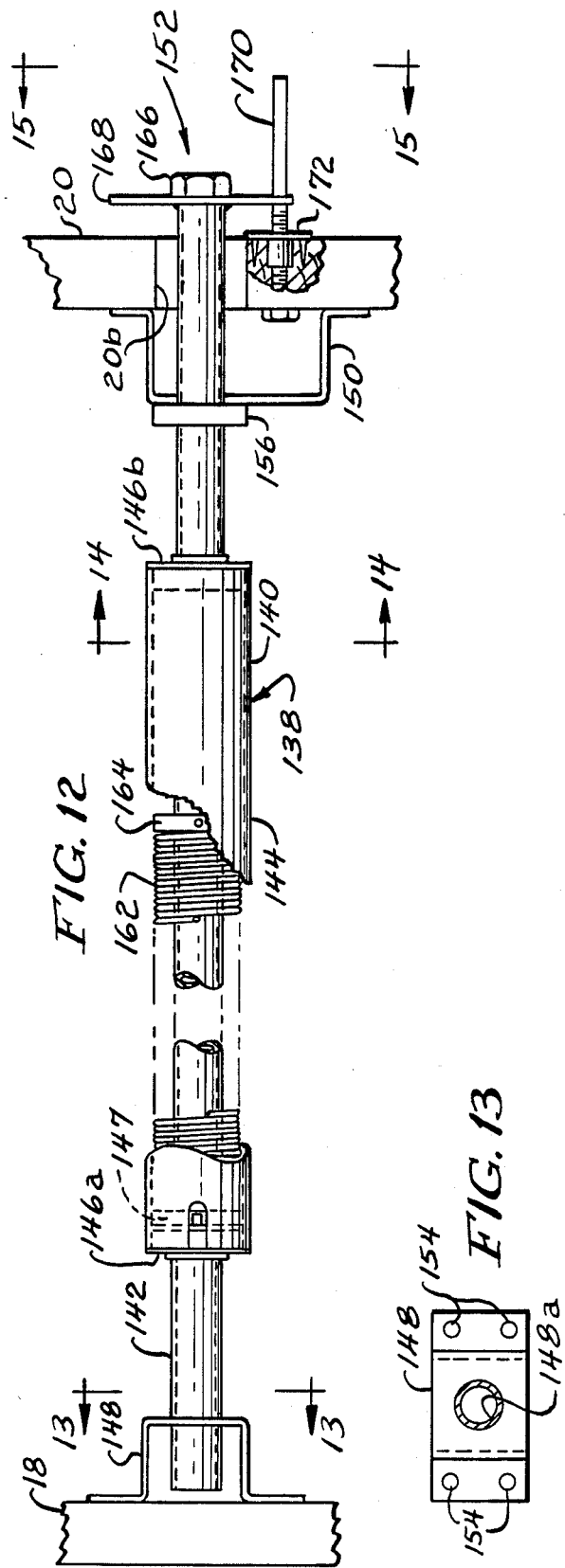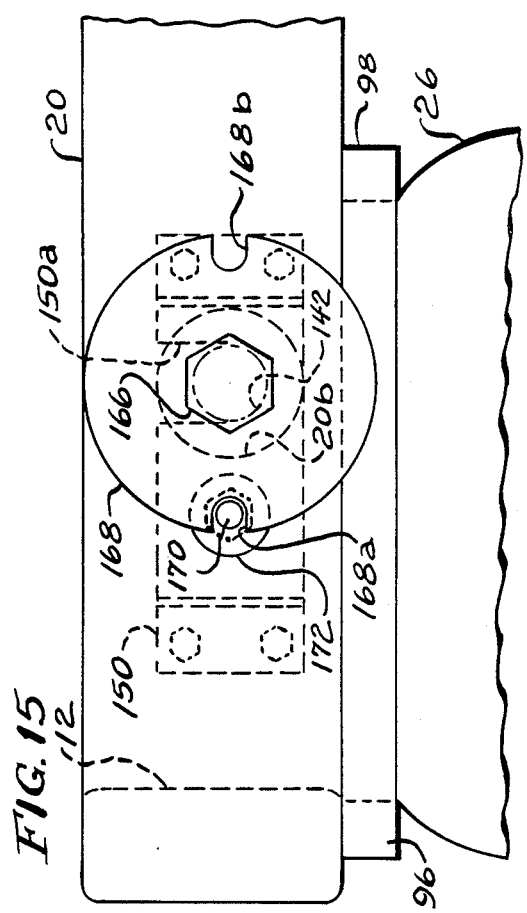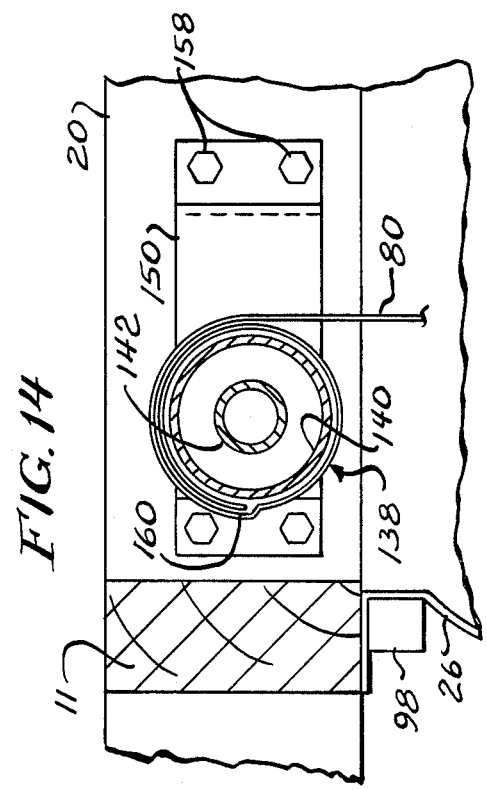

AIR PERIMETER SEAL FOR OPENING

BACKGROUND OF THE INVENTION

This invention relates generally to closure structures positioned in an opening, such as a doorway, and is particularly directed to apparatus disposed about an opening for engaging a body positioned within the opening in a sealed manner, such as a loading vehicle positioned in and extending through a warehouse door opening.

In the loading or unloading of a vehicle through an opening in a wall such as of a warehouse, it is frequently desirable to isolate the interior of the warehouse from the elements outside. For example, for the comfort and safety of the loading/unloading personnel it is frequently desirable, and perhaps essential, to isolate the outside elements of heat, cold, rain, snow, etc., from the working environment within the warehouse during the transfer of goods to or from the vehicle. Security reasons may also necessitate closure of the space between the doorway and the vehicle.

Prior art structures for providing such a seal have involved movable structures which extend outward from a wall of the warehouse and inward toward the center of the doorway in the wall. Such structures are typically termed "dock seals" and may involve fixed peripheral structures about the doorway or an inflatable structure adapted to engage the side of a rail car or end of a trailer positioned adjacent to the warehouse wall. Examples of inflatable dock seals can be found in U.S. Pat. Nos. 3,303,615 (a single elongated inflatable tubular member mounted to adjacent outer and inner corner sections of a building opening); 3,391,503 (interconnected top and side elongated inflatable tubular members affixed to a building wall adjacent to an aperture therein and extending outward from the wall); 4,262,458 (four interconnected inflatable members disposed about a rectangular aperture in a wall for extension outward from the wall when inflated); and 4,389,821 (an inflatable dock seal wherein the three seal structures move outwardly from the wall and towards one another when inflated).

These and other prior art dock seals generally involve a complicated mechanical and pneumatic arrangement which is highly subject to deterioration by the outside environment as well as damage from a misaligned vehicle attempting to back up into the wall opening about which the dock seal is disposed. In particular, those arrangements which extend inwardly from the sides of the aperture tend to extend substantially into the aperture even when retracted making them particularly susceptible to engagement and damage by a moving vehicle and only provide limited sealing engagement with a vehicle.

The present invention overcomes the aforementioned limitations of the prior art by providing an air perimeter seal for an opening which is adapted for tightfitting, sealed engagement with an object such as a vehicle positioned within the opening. The air perimeter seal is comprised of an upper and two side accordian-like flexible and inflatable sections which are coupled together and are further coupled to a source of air under pressure such as a blower. The three inflatable sections are particularly adapted for positioning on the side and upper edges of a rectangular door opening and for engaging a loading vehicle positioned within the door opening.

OBJECTS OF THE INVENTION

Accordingly, it is an object of the present invention to provide an arrangement for engaging a vehicle positioned within an aperture in a wall in a sealed manner around the periphery thereof.

It is another object of the present invention to provide an air inflatable seal structure positioned around the inner periphery of a doorway opening for securely engaging a loading vehicle positioned within the doorway in a sealed manner when inflated and for assuming a retracted, non-engaging configuration when deflated.

Still another object of the present invention is to provide an improved air-inflatable perimeter seal for an opening which is economical, reliable, durable, and provides a gasket-like seal with an object positioned within the opening regardless of the object's cross sectional dimensions or shape.

A further object of the present invention is to provide an air perimeter seal for an opening which is easily and quickly extended by air under pressure to an object-engaging configuration and which automatically retracts to a stored position when the pressurized air is removed.

A still further object of the present invention is to provide an inflatable air seal for engaging a vehicle positioned within an opening in a wall in a sealed manner which is capable of economical operation and fabrication, which is relatively simple in construction, and which effectively isolates the areas on facing sides of the wall from each other.

Another object of the present invention is to provide a dock seal wherein facing edges of the expandable side portions are maintained in precise alignment with each other and with the sides of a vehicle.

The present invention contemplates an air perimeter seal comprised of flexible, resilient and inflatable upper, or head, and first and second side bags which are respectively positioned adjacent to the top and lateral edges of a rectangular opening, such as a doorway, in a wall. A source of air under pressure such as a blower delivers an air flow to the head bag and thence via respective manifolds to the two facing side bags. The head bag is comprised of a plurality of elongated, coupled, pleated sections suspended from a support frame header and extending across the width of the support frame. The side bags are also each comprised of a plurality of elongated, coupled, pleated sections mounted to respective lateral side walls of the support frame. Each of the pleated sections is coupled to an immediately adjacent pleated section (or sections) in a serial arrangement by means of an apertured baffle which permits air to flow freely between adjacent pleated sections. The distal edges of the head and side bags are coupled via ropes or tape strips to respective retraction means which bias the head and side bags to a retracted position wherein the inflatable bags are positioned immediately adjacent to a respective edge of the doorway when air under pressure is no longer delivered to the perimeter seal. The biasing means for the side bags are comprised of respective combinations of pulleys and weights, while the biasing means for the head bag include a torsion spring-biased roller to which the head bag is coupled by means of the retraction tape strips.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a perspective view of an air perimeter seal for an opening in accordance with the present invention;

FIG. 2 is a front view of a lateral portion of the air perimeter seal of FIG. 1;

FIG. 3 illustrates the manner in which the inflatable side bags of the air perimeter seal are suspended from and movable along a header positioned adjacent to the top of the opening;

FIG. 4 is a horizontal sectional view of the portion of the air perimeter seal illustrated in FIG. 2 taken along sight line 4—4 therein;

FIG. 5 is a horizontal sectional view of an inflatable side bag of the air perimeter seal in the fully retracted configuration;

FIG. 6 is a partial vertical sectional view of a portion of a side bag, a head bag and a manifold arrangement coupling these bags of the air perimeter seal illustrated in FIG. 2 taken along sight line 6—6 therein;

FIG. 7 is a front view shown partially in phantom of a head bag in the extended configuration for use in the air perimeter seal of the present invention;

FIG. 8 is a vertical sectional view of the head bag illustrated in FIG. 7 taken along sight line 8—8 therein;

FIG. 9 is a side view of a support frame used in the air perimeter seal illustrated in FIG. 1;

FIG. 12 is a partially cutaway planar view of a header spring/roller and the manner in which it is mounted in the air perimeter seal of the present invention;

FIG. 13 is a sectional view of the header spring/roller and mounting arrangement therefor illustrated in FIG. 12 taken along sight line 13—13 therein;

FIG. 14 is a sectional view of the header spring/roller and mounting arrangement therefor illustrated in FIG. 12 taken along sight line 14—14 therein; and FIG. 15 is an end-on view shown partially in phantom of the header spring/roller and mounting arrangement therefor illustrated in FIG. 12 taken along sight line 15—15 therein.

DETAILED DESCRIPTION OF THE PREFERRED EMBODIMENT

Figure 10:
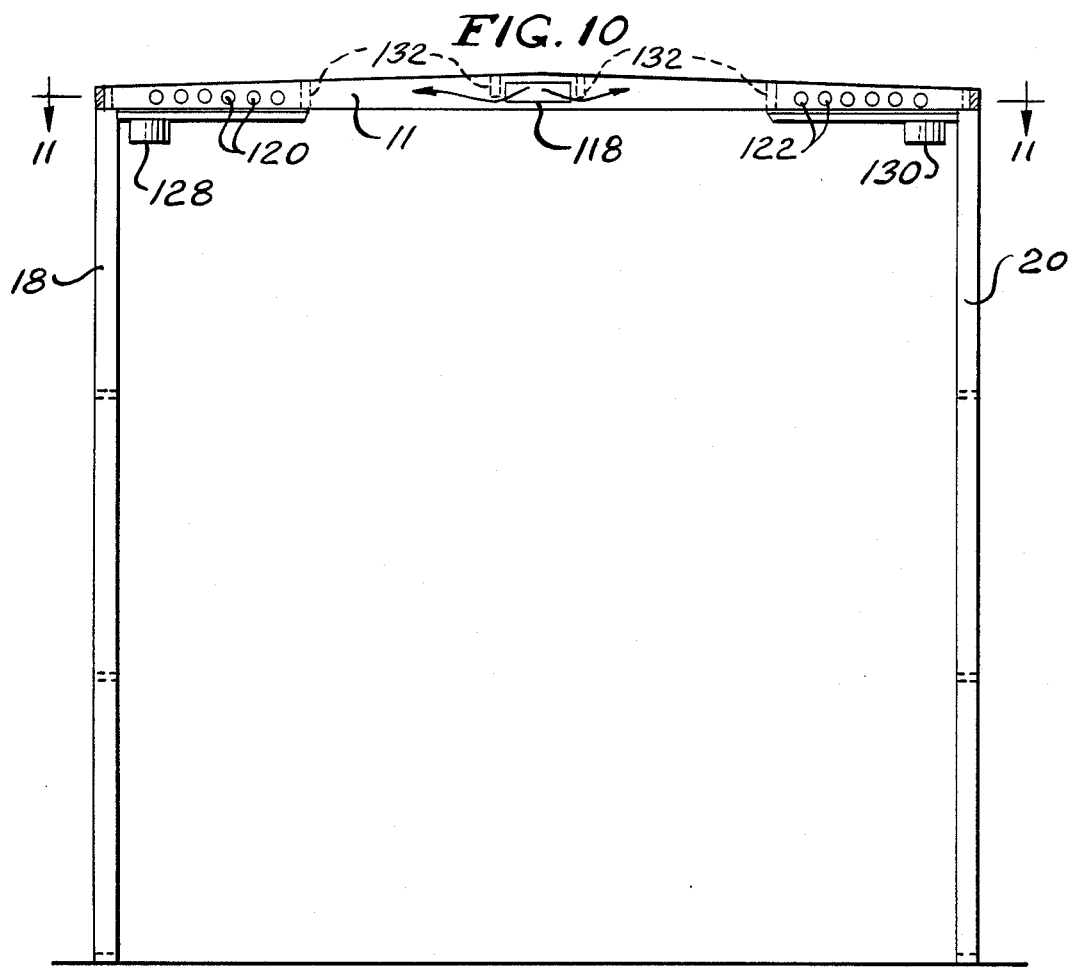
FIG. 10 is a sectional view of the air perimeter seal support frame illustrated in FIG. 9 taken along sight line 10—10 therein.

Referring to FIG. 1, there is shown a perspective view of an air perimeter seal 10 in accordance with the present invention.

The air perimeter seal 10 includes a front raked header 12 and first and second side frames 18 and 20. The raked header 12 is securely mounted adjacent to an upper portion of an aperture in a wall and on the outer surface thereof by conventional means such as combinations of mounting brackets and bolts. The first and second side frames 18, 20 are securely mounted adjacent to facing lateral edges of the aperture and also on the outer surface of the wall and extend downward from the raked header 12. Positioned at respective lower ends of the first and second side frames 18, 20 and also affixed to the wall immediately adjacent to the aperture therein are first and second guard/stop brackets 22 and 24. The first and second guard/stop brackets 22, 24 extend outward from the wall beyond the side frames and respectively provide impact protection for the lower portions of the first and second side frames 18, 20 by preventing a vehicle from backing into these support frame members of the air perimeter seal 10. In a preferred embodiment, the first and second guard/stop brackets 22 and 24 are comprised of a high strength steel, while the first and second side and front frame members are comprised of a treated, high strength wood which is covered by an outer sheath of hypalon or high strength canvas.

Positioned on the upper edge of the front raked header 12 (as well as on an intermediate and an aft raked header which are not shown in FIG. 1) and extending along the length thereof are first and second sheathing sections 16a and 16b which are preferably comprised of a high density polyethylene material or of fiberglass. The first and second sheathing sections 16a, 16b extend outward over the opposed ends of the front raked header 12 with an approximately 1 inch overhang, with caulk disposed around the first and second sheathing sections in position on the upper portion of the support frame of the air perimeter seal 10. An aluminum angle 14a is disposed on the upper, outer edge of the front raked header 12 to provide a drip edge therefor. The raked nature of the front header 12, as well as of the intermediate and aft headers described below, allows for water runoff and provides improved isolation for internal components of the air perimeter seal from the elements.

The air perimeter seal 10 further includes a head bag 26 as well as first and second side bags 30 and 32. The head bag 26 includes a plurality of connected pleated sections 26a and is formed of a single piece of flexible, resilient, inflatable material such as polyurethane. When inflated, the head bag 26 and the first and second side bags 30, 32 expand inwardly toward the center of the aperture in the wall in which the air perimeter seal is mounted so as to engage the upper and lateral peripheral surfaces of a vehicle, such as a cargo truck, positioned within the aperture as described in detail below. An open edge of the head bag 26 is positioned adjacent to the front and intermediate headers from which the head bag is suspended. Respective open edges of the side bags 30 and 32 are positioned immediately adjacent to first and second side frames 18 and 20 to which the side bags are respectively mounted. Each of the head and side bags 26, 30 and 32 are biased to an open, or retracted, position to facilitate movement of the loading vehicle into or out of the aperture in the wall about which the air perimeter seal 10 is positioned without the vehicle contacting or damaging the air perimeter seal. Additional details of the structure and operation of the air perimeter seal 10 of the present invention are provided in the following paragraphs.

Referring to FIGS. 2 through 8, there are shown additional details of the head bag 26 and the first and second side bags 30, 32 and the manner in which they are positioned within the air perimeter seal 10. FIGS. 4 and 5 respectively illustrate the first side bag 30 in the fully extended and in the fully retracted positions. The second side bag 32 has a similar configuration and operates in a similar manner, with the present description applying also to that side bag. Positioned within the first side frame 18 is a generally vertically oriented mounting beam 54. The first side bag 30 is comprised of a single piece of material such as polyurethane and is mounted along respective edges thereof to facing edges of the mounting beam 54 by means of first and second nailer strips 56a and 56b. Nailer strips 56a, 56b are secured to the facing edges of the mounting beam 54 along the length thereof in a conventional manner such as by nailing the strips thereto. The upper and lower edges of the first and second side bags 30, 32 are coupled together in a sealed manner so as to form a substantially closed, hollow sheet of fabric. Extending between the facing surfaces of the first side bag 31a and substantially along the entire length thereof are a plurality of spaced open meshed baffles 31a having one or more apertures therein to allow air to flow between the chambers within the first side bag defined by the baffles. The baffles 31a form the first side bag 30 into a plurality of serially coupled pleated sections 30a forming a single, unitary air chamber.

The upper edge portion of the first side bag 30 is coupled to and supported by a support track 40 mounted to a lower edge of the front raked header 12. The upper edge of the first side bag 30 is provided with one or more fabric loops 43 which are coupled to the support track 40 by means of the combination of a roller 42 and a hook 44 attached thereto. The distal end of the first side bag 30 is folded over so as to form a loop 64 by means of stitching 66 coupling adjacent portions of the first side bag in forming a nose portion 30b thereof. Positioned within the sewn-in loop 64 and extending substantially along the length of the first side bag 30 is an elongated, rigid alignment tube 50. The upper end of the alignment tube 50 is coupled to and supported by the support track 40 by means of a roller 45 and first hook 47 combination together with a coupling link 46 and a second hook 48. The weight of the alignment tube 50 and the manner in which it is suspended maintains the nose portion 30b of the first side bag 30 in a generally vertical orientation and parallel with the facing side frame members of the air perimeter seal 10. A similar alignment tube is positioned with the second side bag to ensure alignment between the facing nose portions of the first and second side bags. The alignment tube 50 is comprised of aluminum in a preferred embodiment.

Coupled to the alignment tube 50 along the length thereof are a plurality of spaced ropes or straps 52. Each of the ropes 52 is inserted through a respective aperture in facing portions of the alignment tube 50 and is secured therein by means of a knot 52a tied on a first end of the rope. A second end of each of the ropes is passed over a respective pulley 58 and securely coupled to a respective weight 60. Each of the pulleys 58 is coupled to a respective support frame cross member 68 by means of a coupling link 70. Under the influence of gravity, the weights 60 urge the distal end portion of the first side bag 30 toward the first side frame 18 so as to assume a retracted position wherein the aperture in the wall is fully opened and unobstructed by the first side bag. A similar support and biasing arrangement is provided for the second side bag 32. The outward biasing effect of the weight 60 on the first and second side bags 30, 32 is counteracted by the blowing of air under pressure into the side bags whereupon the side bags become inflated and the distal ends thereof are displaced toward the center of the aperture so as to engage lateral facing surfaces of a vehicle positioned within the aperture. As shown in FIGS. 2 and 3, the upper edge portion of the first side bag 30 (as well as that of the second side bag 32) is angled downwardly toward the distal edge of the side bag in order to reduce the possibility of the various combinations of hooks, loops and coupling links positioned along the length of the upper edge of the first side bag 30 from becoming engaged with one another and preventing either full extension or retraction of the side bag or jamming of one or more of the rollers in the support track 40. A gap between the upper edges of the first and second side bags 30, 32 and the raked front header 12, as well as the support track 40 suspended therefrom, is covered by the head bag 26 when extended to the lowered position as shown in FIG. 1.

Referring to FIG. 9, there are shown additional details of the first side frame 18, with the second side frame having a similar configuration and structure. The first side frame 18 includes a pair of spaced, vertical supports 114, with a plurality of support frame cross members 68 extending and providing coupling therebetween. An upper cross member 72 also provides coupling between the two vertical supports 114 as well as support for the outer edge of the first sheathing section 16a. The forward end portion of the upper cross member 72 defines the forward surface of the upper frame portion of the air perimeter seal. The outer surface of the first side frame 18 is provided with a weatherproof sheathing such as comprised of hypalon or high strength canvas, while the forward and aft portions of the first side frame, as well as those portions of the second side frame, are provided with respective front and aft frame members which are also covered with hypalon or a high strength canvas, with the front frame members 18a and 20a shown in FIG. 1.

The head bag 26 also includes a plurality of spaced open mesh baffles 94 extending along the length thereof and forming the head bag into a plurality of serially coupled pleated sections 26a. Air is free to flow between immediately adjacent pleated sections 26a in the head bag 26 by means of the apertures within the baffles 94. The upper edges of the head bag 26 are coupled to and supported from the forward raked header 12 as well as from an intermediate raked header 11. Front and aft nailer strips 96, 98 engage respective edges of the head bag 26 and are secured to the front and intermediate raked headers 12, 11 by conventional means such as nails. There is formed in the lower closed edge of the head bag 26 a lift loop 84 by means of stitching 92 in the distal end of the head bag. A plurality of spaced lifting straps 80 are coupled at respective ends thereof to the sewn-in lift loop 84 along the length of the head bag 26. When in the extended, inflated configuration, the nose end 90 of the head bag 26 engages an upper surface of a vehicle positioned within the opening in which the air perimeter seal 10 is located. The lifting straps 80 are used to pull the head bag nose 90 upward to the retracted position when air under pressure is no longer provided to the air perimeter seal. In the retracted configuration, the head bag nose 90 is positioned immediately beneath the intermediate and front raked headers 11, 12. Air flow is provided to the head bag 26 via a blower/header duct 118 positioned in an upper portion of the air perimeter seal's support frame. The nose portion 90 of the head bag 26 is provided with a plurality of spaced breather holes 82 along the length thereof each of which preferably includes a grommet. The breather holes 82 prevent excessive pressure buildup within the air perimeter seal 10 and the application of a high back pressure on the source of pressurized air. The upper, lateral edges of the head bag 26 are provided with a respective inspection pocket 88. Each of the inspection pockets 88 is covered by a movable closure flap 86 which is maintained in position in one embodiment by means of Velcro strips. The inspection pockets 88 allow for visual inspection of the interior of the head bag 26 and adjustment of the components therein, while the closure flaps 86 protect the interior of the head bag from the environment, while maintaining the head bag sealed and thus capable of being inflated.

Figure 11:
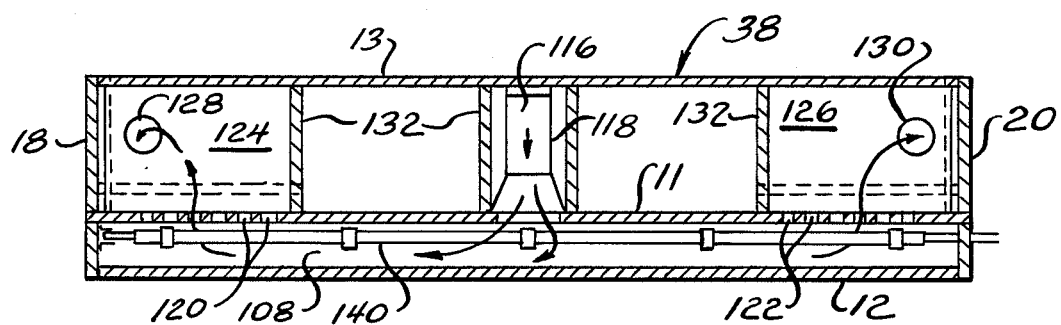
FIG. 11 is a horizontal sectional view of the support frame of the air perimeter seal arrangement of FIG. 10 taken along sight line 11—11 therein.

Referring to FIGS. 6, 10 and 11, there is shown an air supply arrangement for inflating the head bag as well as the first and second side bags. As shown in FIG. 11, the air perimeter seal support structure is positioned within an opening formed by spaced, facing wall sections 34a and 34b. The upper support frame of the air perimeter seal not only includes the aforementioned forward and intermediate raked headers 12 and 11, but also an aft raked header 13. A plurality of spaced mullions 32 provide coupling between the intermediate and aft raked headers 11 and 13, while respective ends of the three raked headers are securely coupled to and supported by the first and second side frames 18 and 20. A blower/header duct 18 is positioned in and mounted to a center portion of the upper support frame 38. Coupled to and continuous with the blower/header duct 118 is a source of air under pressure such as a blower 116. The blower 116 directs air through the blower/header duct 18 toward the forward end of the upper support frame 38 which is defined by the space between the forward and intermediate raked headers 12, 11. As described earlier, the head bag (not shown in FIG. 11) is suspended from and extends beneath the forward and intermediate raked headers 12, 11 and is thus continuous with the space between these raked headers. Thus, air flowing from the blower/header duct 118 flows into and inflates the head bag.

Respective ends of the intermediate header 11 are provided with a plurality of spaced first apertures 120 and second apertures 122. Positioned adjacent to and continuous with the first apertures 120 is a first plenum 124, while positioned adjacent to and continuous with the second apertures 122 is a second plenum 126. The first and second plenums 124, 126 are positioned between the intermediate and aft raked headers 11 and 13 as well as between a respective side frame and mullion 132. Disposed in lower portions of the first and second plenums 124 and 126 are respective first and second ducts 128 and 130. As shown in FIG. 6, the first duct 128 is continuous with and directs air into a manifold 134. The manifold 134, in turn, is continuous with and directs air under pressure into the side bag 30. A similar air flow manifold arrangement is coupled to the second duct 130 for directing air under pressure into side bag 32. Thus, a portion of the air flowing out of the blower/header duct 118 is used to inflate the head bag, while the remaining air is directed into the side bags for inflating the side bags.

Referring to FIGS. 12 through 15, there is shown an arrangement for supporting and retracting the head bag 26 of the air perimeter seal. As described above, the upper, facing edges of the head bag 26 are coupled to and suspended from the forward and intermediate raked headers by means of respective nailer strips, such as shown for the case for nailer strip 98 and the intermediate raked header 11 in FIG. 14. The spaced lifting straps 80 are coupled to and wrapped around a roller tube assembly 140 of a header spring/roller 138 by inserting one end of each of the lifting straps into a coupling slot 160 positioned on the outer periphery of the roller tube assembly. The coupling slot 160 securely engages the ends of the lifting straps 80 for maintaining the lifting straps in engagement with and supported by the roller tube assembly 140. As shown in FIG. 14, counterclockwise rotation of the roller tube assembly 140 will result in retraction of the lifting straps 80 and the lifting of the head bag, while clockwise rotation of the roller tube assembly will result in a lowering of the head bag.

Respective ends of the roller tube assembly 140 are coupled to a support shaft, or axle tube, 142, by means of roller bearings 146a and 146b. Roller bearings 146a and 146b permit free rotation of the roller tube assembly 140 relative to the support shaft 142. Respective ends of the support shaft 142 are securely coupled to and supported by the first and second side frames 18 and 20. A support shaft mounting bracket 148 is securely mounted to the first side frame 18 by means of a plurality of mounting pins 154. The support shaft mounting bracket 148 includes an aperture 148a therein through which one end of the support shaft 142 extends. The other end of the support shaft 142 is positioned within an aperture in a floating end bracket 150 which, in turn, is securely affixed to the second side frame 20 by means of a plurality of mounting pins 158. This end of the support shaft 142 is also positioned within an aperture 20b in the second side frame 20 and extends beyond, or outside of, this side frame. A bearing 156 securely affixed to the support shaft 142 facilitates rotation of the support shaft within the floating end bracket 150 and restricts linear displacement of the support shaft along its length within the mounting bracket 148 and the floating end bracket.

Positioned within the roller tube assembly 140 and disposed about the support shaft 142 along a portion of the length thereof is a winding spring 162. One end of the winding spring 162 is securely coupled to an end of the roller tube assembly 140 by means of the roller bearing 146a and a sealed locking hub 147. The second end of the winding spring 162 is securely coupled to the support shaft 142 by means of a winding hub 164. With the support shaft 142 fixedly positioned within the mounting bracket 148 and floating end bracket 150 and thus not free to rotate therein by means of an arrangement described in detail below and with the support shaft coupled to the roller tube assembly tube 140 by means of the winding spring 162, the roller tube assembly will be urged back to its original rotational orientation after being rotationally displaced relative to the support shaft. Thus, the winding spring 162 biases the roller tube assembly 140 in a counterclockwise direction of rotation when the header spring/roller 138 is viewed as illustrated in FIG. 14. By thus urging the roller tube assembly 140 in a counterclockwise direction of rotation, the winding spring 162 causes the lifting straps 80 to be wound around the roller tube assembly in causing the retraction of the head bag when air under pressure is no longer provided thereto. In this manner, the head bag is automatically retracted to the upraised, or stored, configuration when the source of air under pressure is turned off.

Securely affixed to one end of the support shaft 142 by means of a cap screw 166 is a spring roller locking disc 168. The locking disc 168 is provided with a pair of diagonally spaced first and second peripheral slots 168a and 168b. Also extending through an aperture in the second side frame 20 is a threaded spring roller locking pin 170. The locking pin 170 is securely maintained in position within the aperture in the second side frame 20 by means of a "T" nut 172. The locking pin 170 is also adapted for positioning within one of the slots in the periphery of the locking disc 168. By positioning the locking pin 170 in one of the slots 168a or 168b in the periphery of the locking disc 168, the locking disc as well as the support shaft 142 is maintained in a fixed position in the mounting bracket 148 and the floating end bracket 150 and is not free to rotate. The support shaft 142 must be rigidly mounted in a fixed manner to permit the winding spring 162 to rotationally displace the roller tube assembly 140 so as to retract the head bag coupled thereto by means of the plurality of spaced lifting straps 80. The tension in the winding spring 162 and thus the upward biasing force which it exerts upon the head bag may be adjusted by removing the locking pin 170 and rotating the locking disc 168 over a given angular displacement and again inserting the locking pin within one of the peripheral slots 168a or 168b of the locking disc. It may become necessary to change the rotational position of the spring roller locking disc 168 as the winding spring 162 is used over time in order to provide a constant upward biasing force on the head bag.

There has thus been shown an air perimeter seal for an opening which is comprised of a plurality of coupled inflatable air bags positioned adjacent to and aligned with respective inner edges of a wall which define an opening therein. When air under pressure is provided to the three coupled inflatable air bags, each expands toward the center of the opening so as to engage in a sealed manner an object, such as a loading truck, positioned within the opening and extending therethrough. All three inflatable air bags are retracted to an open position automatically and independently following removal of the air flow thereto.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. For use in an opening in a wall defined by at least an upper and a pair of spaced, facing lateral inner edges of said wall, an air seal comprising:

a support structure positioned on said side wall adjacent to the opening therein and having an upper frame and a pair of spaced side frames respectively positioned adjacent to the upper and a respective one of the facing lateral inner edges of said wall;

an inflatable head bag coupled to and suspended from the upper frame of said support structure;

first and second inflatable side bags each coupled to a respective side frame of said support structure and further coupled to said head bag so as to form a continuous, closed inflatable structure;

coupling means for coupling each of said side bags to said upper frame and allowing said side bags to be displaced along said upper frame while suspended therefrom;

a source of air under pressure coupled to said head bag for inflating said head and first and second side bags such that said head and side bags expand primarily toward a center of the opening in the wall and engage a vehicle positioned within the opening in a sealed manner; and biasing means coupled to said head and side bags for urging said head bag toward said upper frame and each of said side bags toward a respective side frame when air under pressure is no longer provided to said head bag.

2. The air seal of claim 1 further comprising first and second stop means positioned adjacent to respective lower end portions of each of said side frames for protecting said side frames and said side bags from impact damage.

3. The air seal of claim 1 wherein said upper frame includes at least one raked header extending across an upper portion of the wall opening.

4. The air seal of claim 1 wherein each of said head and side bags is comprised of a plurality of serially coupled pleated sections having an open mesh baffle disposed therebetween.

5. The air seal of claim 4 wherein respective opposed edges of said head bag are coupled in a sealed manner to said upper frame and respective opposed edges of each of said side bags are coupled in a sealed manner to a respective side frame.

6. The air seal of claim 5 wherein a distal edge of each of said side bags is formed in the shape of an internal loop along the length thereof and wherein said air seal further includes first and second linear, elongated alignment tubes each positioned within a respective internal loop of the first and second side bags.

7. The air seal of claim 6 wherein said coupling means couples an upper edge of each of said side bags and an upper end of each of said alignment tubes to said upper frame.

8. The air seal of claim 7 wherein said coupling means includes a plurality of movable connecting means for allowing said side bags and said alignment tubes to be displaced along said upper frame while suspended therefrom.

9. The air seal of claim 8 wherein said movable connecting means includes a linear track mounted to said upper frame and a plurality of rollers coupled to the upper edges of the side bags and upper ends of the alignment tubes and engaging said track.

10. The air seal of claim 1 wherein said biasing means includes first and second weights coupled to inner, distal edges of said side bags and positioned within a respective side frame.

11. The air seal of claim 1 wherein said biasing means includes a spring/roller assembly attached to said upper frame and coupled to a lower, distal end of said head bag.

* * * * *